(12) United States Patent
Stoewahse

(10) Patent No.: US 10,210,775 B2
(45) Date of Patent: Feb. 19, 2019

(54) DECORATIVE ARTICLE INCLUDING A GLOBE

(71) Applicant: Ole Stoewahse, Shenzhen (CN)

(72) Inventor: Ole Stoewahse, Shenzhen (CN)

( * ) Notice: Subject to any disclaimer, the term of this patent is extended or adjusted under 35 U.S.C. 154(b) by 0 days.

(21) Appl. No.: 15/915,798

(22) Filed: Mar. 8, 2018

(65) Prior Publication Data

US 2018/0261132 A1 Sep. 13, 2018

(30) Foreign Application Priority Data

Mar. 8, 2017 (DE) .................. 10 2017 203 829

(51) Int. Cl.
| | |
|---|---|
| *G09B 27/08* | (2006.01) |
| *F21V 33/00* | (2006.01) |
| *F21V 8/00* | (2006.01) |
| *G09B 27/06* | (2006.01) |
| *F21Y 103/33* | (2016.01) |
| *F21Y 103/10* | (2016.01) |
| *F21Y 115/10* | (2016.01) |
| *F21W 121/00* | (2006.01) |

(52) U.S. Cl.
CPC .............. *G09B 27/08* (2013.01); *F21V 33/00* (2013.01); *F21V 33/0004* (2013.01); *G02B 6/0001* (2013.01); *G09B 27/06* (2013.01); *F21W 2121/00* (2013.01); *F21Y 2103/10* (2016.08); *F21Y 2103/33* (2016.08); *F21Y 2115/10* (2016.08)

(58) Field of Classification Search
CPC ...... G09B 27/08; F21V 33/00; F21V 33/0004
USPC ........................................................ 362/809
See application file for complete search history.

(56) References Cited

U.S. PATENT DOCUMENTS 4,477,193 A * 10/1984 Yasufuku ............. G04B 19/226
  368/23
2008/0025026 A1 * 1/2008 Lee ....................... F21S 10/002
  362/253

FOREIGN PATENT DOCUMENTS

| CN | 201035828 Y | * | 3/2008 |
|---|---|---|---|
| CN | 201043731 Y | * | 4/2008 |
| CN | 101577067 | | 11/2009 |
| CN | 203013120 | | 6/2013 |
| CN | 203520754 | | 4/2014 |
| CN | 204406891 | | 6/2015 |
| CN | 205140376 | | 4/2016 |
| DE | 10 2005 022 450 | | 11/2006 |
| DE | 20 2017 101 196 | | 6/2017 |

OTHER PUBLICATIONS

Extended European Search Report from the European Patent Office for Application No. 18 159 782.4, dated May 30, 2018, pp. 1-7.
"Yosoo® Magnetische Geburtstag Wohnkultur Dekoration," Amazon. de, pp. 1-6.
Examination Report from German Patent Office for Application No. 10 2017 203 829.2, dated Nov. 14, 2017, pp. 1-5.

* cited by examiner

*Primary Examiner* — Christopher Raabe
(74) *Attorney, Agent, or Firm* — Saliwanchik, Lloyd & Eisenschenk

(57) ABSTRACT

The present invention relates to a decorative article comprising a globe held on a meridian, wherein the meridian is provided with at least one first light outlet element, the first light outlet element being optically coupled to at least one first lamp.

20 Claims, 2 Drawing Sheets

DECORATIVE ARTICLE INCLUDING A GLOBE

CROSS REFERENCE TO A RELATED APPLICATION

This application claims priority under 35 U.S.C. § 119(e) of German Patent Application No. DE 10 2017 203 829.2, filed Mar. 8, 2017, which is incorporated herein by reference in its entirety.

FIELD OF THE INVENTION

The present invention relates to a decorative article having the features of the preamble of claim 1.

BACKGROUND OF THE INVENTION

Illuminated globes to which a decorative value can be attributed are disclosed in CN 203013120 (U) and CN 203520754 (U). Both embodiments comprise the globe, a stand, which may be equipped with lamps, and a lamp, which is attached to a projection on a meridian. This design requires the projection to be additionally attached to or formed on the meridian in order to be able to attach the lamps thereto. The presence of the projection on the meridian and the presence of a stand results in the need for a larger amount of installation space relative to the size of the globe itself; the projection on the meridian is furthermore an additional component, which entails additional production costs and complexity. Furthermore, the lamp forms a point-like light source on the end of the meridian, or more specifically, on the projection thereof.

BRIEF SUMMARY OF THE INVENTION

The object of the invention is to provide a decorative article comprising a globe or the like which is illuminated and has a superior optical appearance.

In order to achieve this object, a decorative article having the features of claim 1 is proposed in accordance with the invention. Advantageous embodiments and developments can be found in the dependent claims.

According to the basic concept of the invention, the meridian is provided with at least one first light outlet element, and the meridian is produced at least in part from a transparent or partially transparent material, at least one light outlet element being optically coupled to at least one first lamp by means of at least one light guide.

The present invention makes possible decorative illumination of a globe or the like and may be used as indirect or direct room lighting. The term "globe" is not restricted here to a terrestrial globe, but rather also encompasses other celestial bodies, fictitious globes or even non-spherical bodies, such as cylinders, cubes, cones or other bodies, which can be used for decorative, entertainment or educational purposes and that can be provided with image, writing or map material or the like.

The use according to the invention of at least one first light outlet element on the meridian, which element is optically coupled to at least one first lamp, makes possible targeted and decorative illumination of the globe. Furthermore, the lighting, according to the invention, of the globe saves more space, as it is implemented directly by the necessary meridian. This can also bring cost advantages in production. In the process, advantage is taken of the space- and power-saving design of modern lamps. The lighting may also be used to directly or indirectly illuminate a room and therefore does not have to be directed to the globe. One or more first light outlet elements may be provided. One or more first lamps may also be provided. However, the number of first light outlet elements does not have to correspond to the number of first lamps. Preferably, at least one first light outlet element is optically coupled to at least one first lamp by means of at least one light guide. The coupling between the lamp and the light outlet element by means of light guides offers a wide range of structural and functional advantages. By using light guides, the lamp or lamps can be installed at a structurally appropriate point in the meridian. A lamp may supply a plurality of light guides or just one. The light guides may be designed as optical wave guides, planar optical waveguide structures or other suitable structures that allow total reflection. End optical fibres and lateral optical fibres are preferably options for optical waveguides here. By means of suitable selection and formation of the light guide, the light can be decoupled at desired points on the meridian and thus supply the light outlet elements.

It is advantageous for the meridian to be produced at least in part from a transparent or partially transparent material. A transparent design of the meridian can bring additional decorative and functional advantages. If the meridian is transparent or partially transparent, luminous structures that have a decorative or functional effect can be attached in the meridian. The partial transparency may for example be produced by sputtering of the meridian with a metal layer having a defined layer thickness on a designated portion of the surface. As a result, the light can only exit in these designated regions, and it is not possible to see into the interior of the meridian. Consequently, luminous structures are visible in the meridian, but non-luminous structures are not. It may be particularly aesthetically pleasing to also design the transparency or partial transparency in a direction-dependent manner, which can be achieved by means of corresponding optics or a corresponding surface. In this way, luminous structures can only be seen from particular directions and the light emission characteristics can be influenced in a targeted manner.

According to an alternative solution, the meridian is provided with at least one first light outlet element, the first light outlet element being optically coupled to at least one first lamp, the first lamp being formed by a plurality of LEDs in a strip on the meridian.

It is advantageous for the lamp to be designed as an LED. LEDs are particularly power- and space-saving lamps and can be cost-effectively obtained in a variety of colours. The use of LEDs makes possible effective illumination, which can be operated both using batteries, accumulators or the like, and using a suitable power pack. Furthermore, a plurality of cost-effective LEDs can be used in a parallel connection, such that very long-lasting illumination can be achieved. Moreover, LEDs of various designs, preferably of different colours, may be provided. By means of a suitable control system, a desired illumination scheme, preferably a desired colour or colour composition, and a desired illumination direction can be set.

By means of the proposed solution, the meridian can be illuminated in a highly uniform manner. By implementing the first lamp in the form of LEDs in a strip, the meridian can in particular be illuminated along the entire longitudinal extension thereof. In this case, the LEDs may be arranged in a strip and additionally be secured in a strip and fastened to the meridian in this way.

In a preferred embodiment, at least one first light outlet element is designed to be planar. The planar design of the light outlet elements makes possible decorative illumination. The planar light outlet element may be illuminated homogenously or provide brightness or colour gradients. The planar light outlet element may be designed to display information, for example in the form of writing, images or a specification of the latitude. The planar design of the light outlet elements provides the basis for a plurality of embodiments. The light outlet elements and in particular the surface thereof may be designed to scatter light in all directions or to guide it in a targeted manner. The light outlet elements may for example be transparent, partially transparent or opaque. The surface of the light outlet elements may be even or may have a structured surface. The meridian may be formed by means of a suitable multicomponent injection moulding process such that the light outlet elements are incorporated into the meridian. The light outlet elements may therefore be of any size. The entire meridian may also be designed as a light outlet element. Alternatively, the meridian may be designed so as to be able to receive the light outlet elements. In this embodiment, the light outlet elements may for example be adhesively bonded, and the meridian may consist of any suitable material.

Preferably, at least one first light outlet element is designed to be point-like. The point-like light outlet element may be used to illuminate particular parts of the globe in a targeted manner. For example, the equator or another line of latitude may be displayed in a targeted manner. However, the use of a plurality of point-like light outlet elements is also possible, for example in a regular arrangement, which allows homogenous illumination.

It is also advantageous for the meridian to comprise an opaque surface at least in part. The selection of an opaque material or an opaque surface can be aesthetically pleasing. If the meridian is produced at least in part from an opaque material, for example milk glass or a suitable plastics material, or is provided with an opaque surface, the meridian can be illuminated from the inside without it being possible to see inside. The opacity of the surface may be based on various processes, such as lacquering, coating, structuring, chemical manipulation or similar surface treatment methods. It may be particularly aesthetically pleasing to also make the opacity direction-dependent, which can be achieved by means of corresponding optics or a corresponding surface. Luminous structures can thus only be perceived from particular directions and the light emission characteristics can be influenced in a targeted manner. A combination with a transparent or partially transparent surface may also be aesthetically pleasing.

In a preferred embodiment, at least one first light outlet element is formed by the surface of at least one first lamp. If the light outlet element is formed by the surface of the lamp used, the light outlet element is formed by the lamp used itself. The lamp may be embedded in the meridian. In this case, the power supply of the lamp may be implemented at a suitable connection point on the meridian. Alternatively, the lamp may also be attached to the meridian. This makes it possible for the lighting to be installed on a conventional meridian, such that the tool for producing the meridian does not have to be changed.

In an advantageous embodiment, the lamp is designed as a planar LED. Planar LEDs, particularly preferably OLEDs, make possible planar and power-saving direct illumination. Planar LEDs can further be adapted to the curvature of the meridian.

Preferably, at least one first light outlet element is assigned to the side of the meridian facing the globe. This embodiment guarantees reliable illumination of the globe and may be used to indirectly illuminate the room. Furthermore, the lighting of the globe may also be used to feed light into the globe.

In a preferred embodiment, the light outlet elements are oriented so as to illuminate parts of the globe in a targeted manner. The globe may also be illuminated in a targeted manner in order to highlight particular regions on the globe or in order to represent the position of the sun and thus the time of day.

Preferably, the light can also be coupled into the globe in a targeted manner. If the globe comprises an at least partially transparent surface, the globe is not only externally illuminated, but can also give the impression of being illuminated from the inside. By incorporating light-guiding and light-scattering structures, the targeted illumination of the globe can be used to highlight particular regions on the surface of the globe. Omnidirectional scattering is also possible, which illuminates the entire transparent, partially transparent or opaque region of the globe. Applying light-scattering structures to the surface of the globe is also possible. The light can be coupled into the globe through light-guiding structures on the surface of the globe or by means of suitable mounting of the globe on the meridian. The bearings on the meridian and/or the spindle of the globe may provide light-guiding structures that couple the light into the globe.

It is advantageous for the decorative article to be held on a stand. The stand makes it possible to mount the globe. The stand may also house power sources, preferably power packs, batteries, accumulators or the like.

At least one second light outlet element is preferably provided in the stand. The stand, both as a decorative or as a functional component of the decorative article, may also have a light outlet element and thus lighting that illuminates the globe or the room directly or indirectly.

In a preferred embodiment, at least one second lamp is provided in the stand. In order to photometrically decouple the stand from the meridian, a second lamp may be provided in the stand, which second lamp is assigned to the second light outlet element.

Preferably, the first lamp is identical to the second lamp. The lamps, both for the meridian and for the stand itself, may be arranged in the stand. All electrical components may be housed in the stand, and the light may be transported by means of the light guides to the first and second light outlet elements. This embodiment therefore makes possible a particularly compact or filigree design of the meridian.

The invention has been described in the context of various preferred embodiments in conjunction with the associated advantages. The preferred embodiments described may be combined in any way by a person skilled in the art to form further embodiments that combine the advantages of the individual preferred embodiments.

BRIEF DESCRIPTION OF THE DRAWINGS

The invention is described in the following on the basis of preferred embodiments with reference to the accompanying figures, in which, in detail.

DETAILED DESCRIPTION

Figure 1:
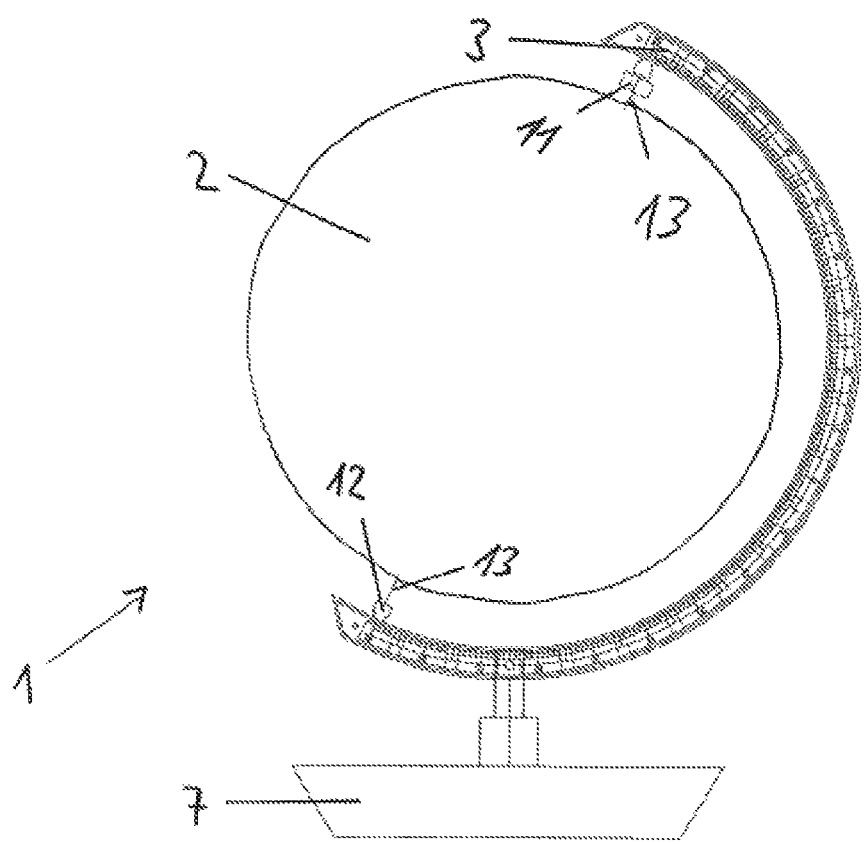
FIG. 1 shows a decorative article comprising a globe and a meridian held on a stand.

FIG. 1 shows a decorative article 1 comprising a globe 2 and a meridian 3 held on a stand 7. The globe 2 is in this case spherical and rotatably held on the meridian 3. However, other objects may also be held by the meridian 3. The stand 7 is not absolutely necessary to the invention if the globe 2 is suspended from the meridian 3 for example. In this case, the globe 2 is held on a spindle 13 which is received in a first bearing 11 and a second bearing 12. The bearings 11, 12 can allow rotation of the globe 2 or receive the globe 2 in a rotationally fixed manner. The first bearing 11, the second bearing 12 and/or the spindle 13 of the globe 2 may be designed to couple light into the globe 2. Alternatively, the globe 2 may guide light at least in part in order to allow said coupling-in of light. Light-guiding or light-scattering structures may be provided inside the globe 2 or on the surface thereof in order to make possible the targeted or omnidirectional illumination at least of parts of the surface of the globe 2. The globe 2 may be hollow or be filled at least in part. Depending on the intended use, various materials may be considered for the globe 2 and the meridian 3. If light-guiding or light-scattering properties play no role, metal, wood, ceramics, plastics material or the like may be used. If light-guiding or light-scattering is provided, the use of glasses and single- or multicomponent plastic materials is advantageous. Transparent, partially transparent or opaque elements may for example be produced by means of a multicomponent injection moulding process and directly incorporated into the meridian 3. Other ways to attach said elements are however also conceivable.

Figure 2:
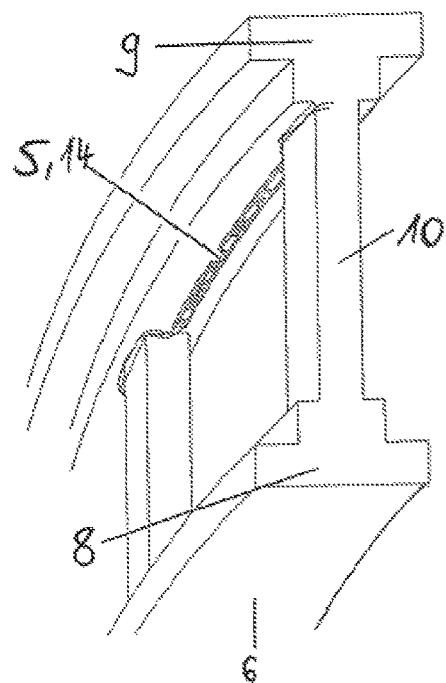
FIG. 2 is a sectional view of the meridian comprising a first light outlet element and a first lamp.

FIG. 2 shows a detail of the meridian 3 comprising a first lamp 5, which is in this case in the form of a strip comprising SMD LEDs 14. The meridian 3 is in this case I-shaped and has a first half-ring 8, which has a side 6 that faces the globe 2, and a second half-ring 9, the first half-ring 8 being connected to the second half-ring 9 by means of at least one web 10. In this embodiment, the first half-ring 8 is closer to the globe 2 than the second half-ring 9. Other embodiments are also conceivable; for example, both half-rings 8, 9 being at the same distance from the globe 2 or there being merely one half-ring. The side 6 of the first half-ring 8 facing the globe 2 may have first light outlet elements 4. The meridian 3 may be transparent, partially transparent or opaque at least in part in order to ensure that light is guided and/or scattered.

The LEDs 14 are in this case arranged or secured in a strip and may be arranged on and fastened to the meridian 3 in a uniform distribution and so as to be equidistant from one another. LEDs 14 of this kind in a strip can be purchased cheaply in large quantities and in particular in long lengths as prefabricated assemblies, and can be individually precut to a predetermined length for arrangement on the meridian and can be fastened to the meridian 3 as such. The LEDs 14 may be secured to the strip such that they can be fastened to the meridian 3 by means of simple fastening of the strip. The distances between the LEDs 14 in the strip or strips having LEDs 14 at a particular distance from one another may be selected such that the meridian 3 is illuminated in as uniform a way as possible.

Figure 3:
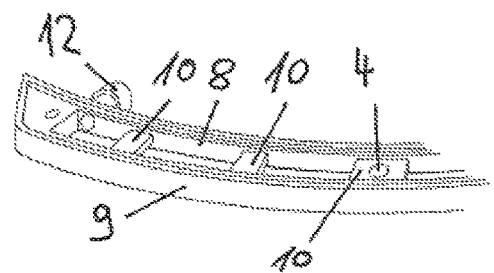
FIG. 3 is an oblique view of the meridian.

FIG. 3 shows the meridian 3 from another perspective. In this case, the first half-ring 8 and the second half-ring 9 are connected by means of at least one web 10. The second bearing 12 is attached to the first half-ring 8 and is provided for receiving the spindle 13. In this embodiment, at least one web 10 has at least one first light outlet element 4. In this embodiment, the light outlet element 4 is not directed to the globe 2. Nevertheless, suitable finishing of the surface of the light outlet element 4 allows targeted illumination of the globe 2.

Figure 4:
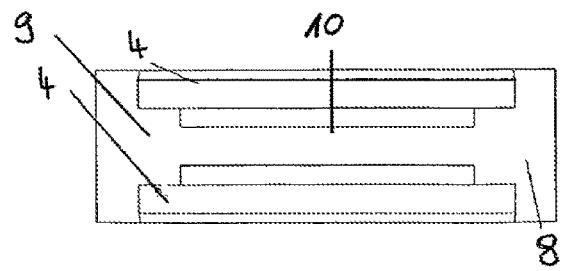
FIG. 4 is a sectional view of the meridian.

FIG. 4 is a sectional view of the meridian 3. In this embodiment, the meridian 3 is also I-shaped and has a web 10, which connects the first half-ring 8 to the second half-ring 9. The meridian 3 is in this case used as a support for the first light outlet element 4, which is adhesively bonded to the meridian 3, for example. The first lamp 5 assigned to the first light outlet element 4 may be designed for example as in FIG. 2, and thus designed for illumination towards the globe 2. Alternatively, the first lamp 5 may be arranged on the web 10 and may for example illuminate the meridian 3 perpendicularly to the radial direction. The half-rings 8 and 9 are designed in a targeted manner in conjunction with the webs 10 such that a cavity is formed between the half-rings 8 and 9, in which cavity the first lamp or lamps 5 is/are arranged. The cavity, together with the first lamps 5 arranged therein, is then covered at the sides by the at least partially transparent light outlet elements 4 such that the light emitted by the first lamps 5 exits through the light outlet elements 4 and illuminates the meridian 3 in the region of the light outlet elements 4.

The invention claimed is:

1. A decorative article, comprising:
a meridian,
wherein the meridian is produced at least in part from a transparent or partially transparent material, and
wherein the meridian is provided with at least one first light outlet element;
a globe,
wherein the globe is mounted on the meridian;
at least one first lamp; and
at least one light guide,
wherein the at least one first light outlet element is optically coupled to the at least one first lamp by the at least one light guide.

2. The decorative article according to claim 1,
wherein the at least one first lamp is formed by a plurality of LEDs in a strip on the meridian.

3. The decorative article according to claim 1,
wherein each first light outlet element of the at least one first light outlet element is designed to be planar.

4. The decorative article according to claim 2,
wherein each LED of the plurality of LEDs is designed to be planar.

5. The decorative article according to claim 1,
wherein each first light outlet element of the at least one first light outlet element is designed to be point-like.

6. The decorative article according to claim 1,
wherein the meridian comprises an opaque surface at least in part.

7. The decorative article according to claim 1,
wherein each first light outlet element of the at least one first light outlet element is formed by a corresponding surface of a corresponding first lamp of the at least one first lamp.

8. The decorative article according to claim 1,
wherein the at least one first lamp is designed as a planar LED.

9. The decorative article according to claim 1,
wherein the at least one first light outlet element is assigned to a side of the meridian facing the globe.

10. The decorative article according to claim 1,
wherein the at least one first light outlet element is oriented so as to illuminate parts of the globe in a targeted manner.

11. The decorative article according to claim 1,
wherein light from the at least one first lamp is coupled into the globe in a targeted manner.

12. The decorative article according to claim 1, further comprising:

a stand,
wherein the meridian is held on the stand.

13. The decorative article according to claim 12, further comprising:
at least one second light outlet element,
wherein the at least one second light outlet element is provided in the stand.

14. The decorative article according to claim 12, further comprising:
at least one second lamp,
wherein the at least one second lamp is provided in the stand.

15. The decorative article according to claim 13, further comprising:
at least one second lamp,
wherein the at least one second lamp is provided in the stand.

16. The decorative article according to claim 14,
wherein each first lamp of the at least one first lamp is identical to each second lamp of the at least one second lamp.

17. The decorative article according to claim 14,
wherein at least one first lamp is provided in the stand.

18. A decorative article, comprising:
a meridian,
wherein the meridian is provided with at least one first light outlet element;
a globe,
wherein the globe is mounted on the meridian; and
at least one first lamp;
wherein the at least one first lamp is formed by a plurality of LEDs in a strip on the meridian, and
wherein the at least one first light outlet element is optically coupled to the plurality of LEDs in the strip.

19. The decorative article according to claim 18,
wherein each LED of the plurality of LEDs is designed to be planar.

20. The decorative article according to claim 18,
wherein the at least one first light outlet element is formed by a corresponding plurality of first light outlet elements, such that each first light outlet element of the plurality of first light outlet elements is optically coupled to a corresponding LED of the plurality of LEDs in the strip.

* * * * *